United States Patent
Jindra et al.

(10) Patent No.: US 11,378,124 B2
(45) Date of Patent: Jul. 5, 2022

(54) CLIP, CLIP ASSEMBLY, AND METHOD OF MAKING AND USING THE SAME

(71) Applicant: SAINT-GOBAIN PERFORMANCE PLASTICS PAMPUS GMBH, Willich (DE)

(72) Inventors: Alexander Jindra, Jüchen (DE); Benjamin Kuemmel, Kerkrade (NL); Volker Huenten, Mönchengladbach (DE); Jan Arpe, Meerbusch (DE); Aline Brocker, Niederkrüchten (DE); Jens D. Speicher, Willich (DE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 1004 days.

(21) Appl. No.: 16/033,495

(22) Filed: Jul. 12, 2018

(65) Prior Publication Data

US 2019/0017548 A1    Jan. 17, 2019

Related U.S. Application Data

(60) Provisional application No. 62/532,564, filed on Jul. 14, 2017.

(51) Int. Cl.
  *F16C 29/00*  (2006.01)
  *F16C 33/20*  (2006.01)
  (Continued)

(52) U.S. Cl.
  CPC .......... *F16C 29/002* (2013.01); *B60N 2/809* (2018.02); *B60N 2/897* (2018.02); *F16B 2/241* (2013.01);
  (Continued)

(58) Field of Classification Search
  CPC .... F16C 27/063; F16C 29/002; F16C 29/005; F16C 29/02; F16C 33/046; F16C 2326/08;
  (Continued)

(56) References Cited

U.S. PATENT DOCUMENTS 202,380 A * 4/1878 Severance ................. E06B 3/44
                                                49/442
452,098 A * 5/1891 Collins ..................... E06B 3/44
                                                49/421
(Continued)

FOREIGN PATENT DOCUMENTS

CN     103655085 A     3/2014
DE     19845949 A1     4/2000
(Continued)

OTHER PUBLICATIONS

International Search Report and Written Opinion for PCT/EP2018/068861, dated Nov. 20, 2018, 16 pages.
(Continued)

*Primary Examiner* — Alan B Waits
(74) *Attorney, Agent, or Firm* — Abel Schillinger, LLP; David G Miranda

(57) ABSTRACT

A clip for providing a sliding force towards a movable substrate, the clip including at least one strip, where the at least one strip comprises a first axial end and a second axial end and an arcuate shape between the first axial end and the second axial end; where the at least one strip is a metal strip including a sliding layer at an outbound side.

14 Claims, 6 Drawing Sheets

(51) Int. Cl.
  *F16B 2/24*    (2006.01)
  *B60N 2/897*   (2018.01)
  *F16C 29/02*   (2006.01)
  *B60N 2/809*   (2018.01)
  *F16C 33/04*   (2006.01)
  *F16C 33/12*   (2006.01)

(52) U.S. Cl.
  CPC ............ *F16C 29/02* (2013.01); *F16C 33/046* (2013.01); *F16C 33/203* (2013.01); *F16C 33/122* (2013.01); *F16C 2326/08* (2013.01); *Y10T 403/32483* (2015.01); *Y10T 403/7176* (2015.01)

(58) Field of Classification Search
  CPC ......... F16C 33/122; F16C 33/203; F16F 1/18; F16F 1/185; F16F 1/187; F16F 1/38; B60N 2/809; B60N 2/824; B60N 2/897; F16B 2/24; F16B 2/241; Y10T 403/32483; Y10T 403/7176
  See application file for complete search history.

(56) References Cited

U.S. PATENT DOCUMENTS

| | | | |
|---|---|---|---|
| 2,450,078 A * | 9/1948 | Booth, Jr. | ................. E06B 3/44 |
| | | | 49/428 |
| 1,976,493 A | 12/1990 | Frankila | |
| 5,080,437 A | 1/1992 | Pesta et al. | |
| 5,180,207 A | 1/1993 | Schmidt | |
| 5,372,430 A | 12/1994 | Orndorff, Jr. et al. | |
| 5,788,250 A | 8/1998 | Masters et al. | |
| 5,816,658 A | 10/1998 | Wallis | |
| 6,296,236 B1 * | 10/2001 | Ott | .......................... B60T 17/00 |
| | | | 267/140.11 |
| 7,491,353 B2 | 2/2009 | Kim et al. | |
| 7,695,194 B2 | 4/2010 | Bouru | |
| 8,021,051 B2 | 9/2011 | James | |
| 9,776,540 B2 | 10/2017 | Otto | |
| 2002/0051586 A1 | 5/2002 | Orndorff, Jr. et al. | |
| 2002/0157235 A1 | 10/2002 | Napolitano, Jr. et al. | |
| 2003/0151290 A1 | 8/2003 | Gans et al. | |
| 2006/0250017 A1 | 11/2006 | Otto et al. | |
| 2010/0021263 A1 | 1/2010 | Holt et al. | |
| 2011/0076096 A1 | 3/2011 | Slayne et al. | |
| 2012/0168061 A1 | 7/2012 | Lien et al. | |
| 2012/0200135 A1 | 8/2012 | Muto et al. | |
| 2013/0206930 A1 | 8/2013 | Gottwald et al. | |
| 2015/0001907 A1 | 1/2015 | Hagan et al. | |
| 2015/0001908 A1 | 1/2015 | Hagan et al. | |
| 2015/0028644 A1 | 1/2015 | Hagan et al. | |
| 2016/0176324 A1 * | 6/2016 | Otto | ........................ F16C 29/02 |
| | | | 297/391 |

FOREIGN PATENT DOCUMENTS

| | | | |
|---|---|---|---|
| DE | 102008016202 | B3 | 7/2009 |
| EP | 0254307 | A1 | 1/1988 |
| EP | 1535795 | A1 | 6/2005 |
| FR | 2157566 | A5 | 6/1973 |
| WO | 2010058306 | A1 | 5/2010 |
| WO | 2011060043 | A2 | 5/2011 |
| WO | 2014210271 | A1 | 12/2014 |
| WO | 2014210302 | A1 | 12/2014 |
| WO | 2016060660 | A1 | 4/2016 |
| WO | 2016097283 | A1 | 6/2016 |
| WO | 2016198692 | A1 | 12/2016 |

OTHER PUBLICATIONS

International Search Report and Written Opinion for PCT/EP2015/080473, dated Apr. 12, 2016, 13 pages.

* cited by examiner

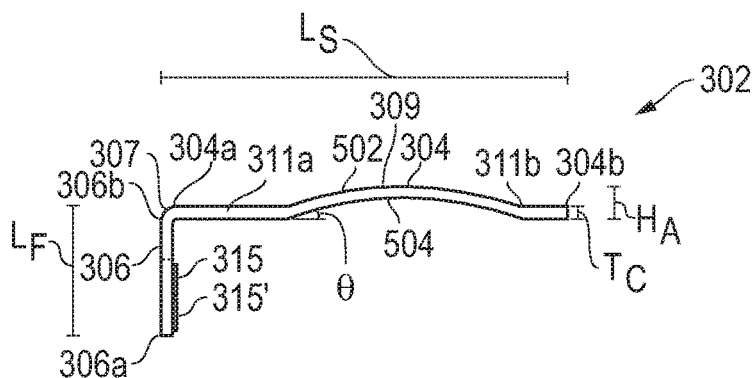
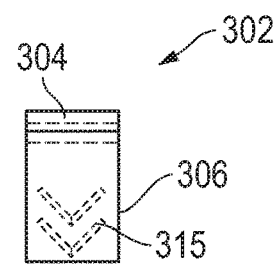
FIG. 3A
FIG. 3C
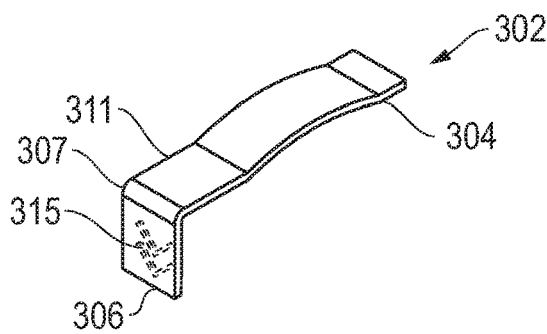
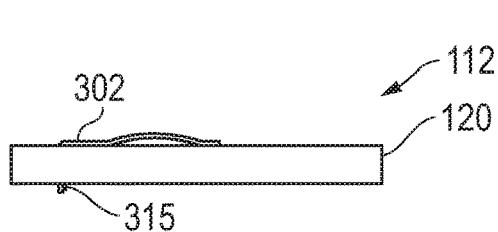
FIG. 3B
FIG. 3D
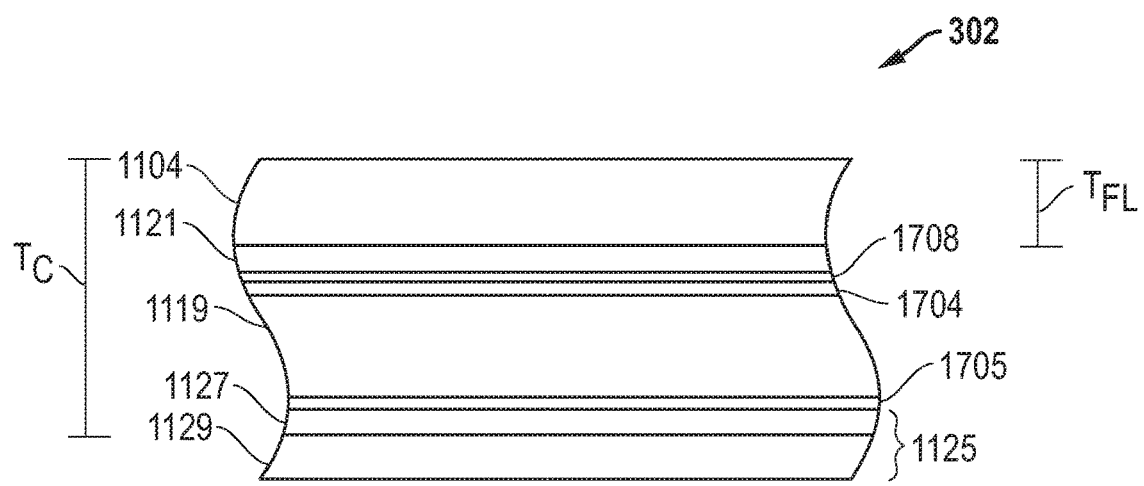
FIG. 5

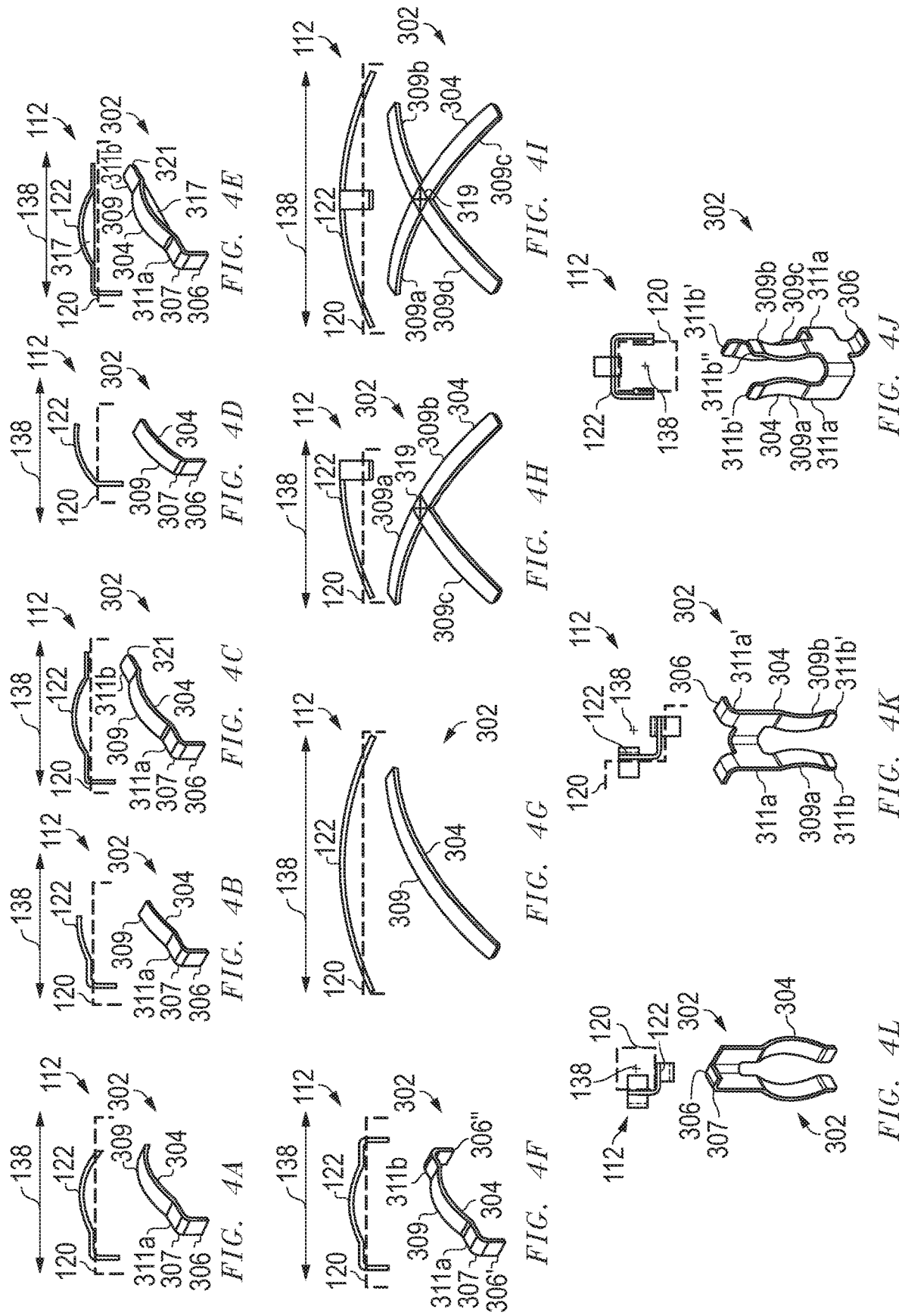

CLIP, CLIP ASSEMBLY, AND METHOD OF MAKING AND USING THE SAME

CROSS-REFERENCE TO RELATED APPLICATION(S)

This application claims priority under 35 U.S.C. § 119(e) to U.S. Patent Application No. 62/532,564 entitled "CLIP, CLIP ASSEMBLY, AND METHOD OF MAKING AND USING THE SAME," by Alexander Jindra et al., filed Jul. 14, 2017, which is assigned to the current assignee hereof and incorporated herein by reference in its entirety.

FIELD OF THE DISCLOSURE

The present disclosure is directed to a clip, a clip assembly including a bearing, and a method of making and using the same.

RELATED ART

Bearings provide slip interfaces between moving components in moving assemblies where one component moves relative to another. At a most basic level, a bearing can include a low friction material interfacing between two components which are movable with respect to one another. The bearing can include a material which lowers the coefficient of friction between the two components, thus facilitating easier movement therebetween.

Moving assemblies, including, but not limited to, hinge assemblies, rotational assemblies, and sliding assemblies, traditionally include an inner component (or shaft) and an outer component (or housing). A bearing can be disposed between the inner component and the outer component to facilitate translation therebetween.

The industry continues to demand a moving assembly capable of providing sufficient rigidity and a suitable low friction slip interface with a defined sliding force while simultaneously having a cost effective design.

BRIEF DESCRIPTION OF THE DRAWINGS

Embodiments are illustrated by way of example and are not intended to be limited in the accompanying figures.

FIG. 3A includes a side view of a clip in accordance with an embodiment.

FIG. 3B includes a perspective top view of a clip in accordance with an embodiment.

FIG. 3C includes an end view of a clip in accordance with an embodiment.

FIG. 3D includes an end view of a clip and a mounting in accordance with an embodiment.

FIG. 4A includes a perspective top view of a clip and a side view of a clip and a mounting in accordance with an embodiment.

FIG. 4B includes a perspective top view of a clip and a side view of a clip and a mounting in accordance with an embodiment.

FIG. 4C includes a perspective top view of a clip and a side view of a clip and a mounting in accordance with an embodiment.

FIG. 4D includes a perspective top view of a clip and a side view of a clip and a mounting in accordance with an embodiment.

FIG. 4E includes a perspective top view of a clip and a side view of a clip and a mounting in accordance with an embodiment.

FIG. 4F includes a perspective top view of a clip and a side view of a clip and a mounting in accordance with an embodiment.

FIG. 4G includes a perspective top view of a clip and a side view of a clip and a mounting in accordance with an embodiment.

FIG. 4H includes a perspective top view of a clip and a side view of a clip and a mounting in accordance with an embodiment.

FIG. 4I includes a perspective top view of a clip and a side view of a clip and a mounting in accordance with an embodiment.

FIG. 4J includes a perspective top view of a clip and a side view of a clip and a mounting in accordance with an embodiment.

FIG. 4K includes a perspective side view of a clip and a top view of a clip and a mounting in accordance with an embodiment.

FIG. 4L includes a perspective side view of a clip and a top view of a clip and a mounting in accordance with an embodiment.

FIG. 5 is a schematic sectional side view of another embodiment of a clip having layers and is constructed in accordance with the invention.

DETAILED DESCRIPTION

Figure 1:
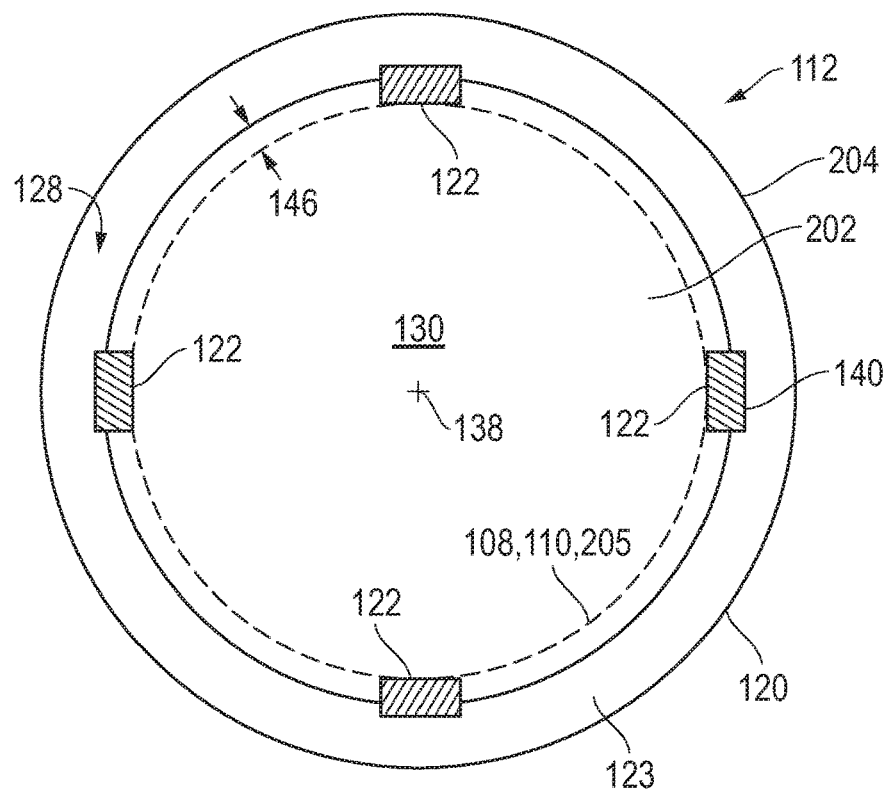
FIG. 1 includes a top elevation view of a clip assembly in accordance with an embodiment.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing and head restraint arts.

A clip assembly in accordance with one or more of the embodiments described herein can generally include a movable substrate and a sliding component in the form of a clip disposed adjacent to the movable substrate. In a number of embodiments, the clip assembly in accordance with one or more of the embodiments described herein can generally include an annular movable substrate and a sliding component in the form of a clip disposed radially inside or outside of the annular movable substrate. The sliding component may include at least one discrete segment or discrete clip. As used herein, "discrete segments" refer to distinct segments or components or clips. "Discrete segments" may be disconnected or discontinuous so as to be detached from one another. In an embodiment, the sliding component includes at least three discrete segments, such as at least four discrete segments, at least five discrete segments, or even at least ten discrete segments. The discrete segments may each be spaced apart from one another, i.e., the discrete segments do not contact or overlap. In this regard, the inner surface of the clip assembly may include a surface area that may be greater than a contact area of the sliding component therein. This may reduce the overall cost of the clip assembly and minimize the use of unnecessary materials.

A method of forming a clip assembly or clip in accordance with one or more of the embodiments described herein can generally include shaping a plurality of sliding components, aligning the sliding components in alignment, and aligning a material to the sliding components. In a number of embodiments, the method may also include forming a first component, mounting, or body to support the sliding components. The body may be generally annular or may be non-annular.

FIG. 1 illustrates a top view of a clip assembly 112 relative to a central axis 138 in accordance with an embodiment. The clip assembly 112 may generally include a first component (or body or mounting) 120 and at least one second component (or sliding component or clip) 122. The second component 122 may be coupled to the first component 120. In a number of embodiments, the clip assembly 112 may be disposed between a first movable component 202 and a second movable component 204, facilitating the movement of the first movable component 202 relative to the second movable component 204, or the second movable component 204 relative to the first movable component 202. In a number of embodiments, a part of the clip assembly 112 (such as the first component 120 or the second component 122) may be the first movable component 202 or the second movable component 204. In a number of embodiments, a part of the clip assembly 112 (such as the first component 120 or the second component 122) may be a part or component of the first movable component 202 or the second movable component 204. In a number of variations, at least one of the first movable component 202 or the second movable component 204 may include a movable substrate 205. The movable substrate 205 may be a shaft or a profile. In a different embodiment, multiple clip assemblies 112 may be used to facilitate movement between at least two a coupled objects, each with multiple first movable components 202 or second movable components 204. In a number of embodiments, the clip assembly 112 may be disposed between an inner component 202 and an outer component 204, facilitating the movement of the inner component 202 relative to the outer component 202, or the outer component 204 relative to the inner component 202. In a number of embodiments, the first component 120 may include the first movable component 202 or the second movable component 204, with the other of the first movable component 202 or the second movable component 204 moving relative to the first component 120. In a number of embodiments, the first component 120 may include the first movable component 202 or the second movable component 204, with the first component 120 moving relative to the other of the first movable component 202 or the second movable component 204.

Figure 7:
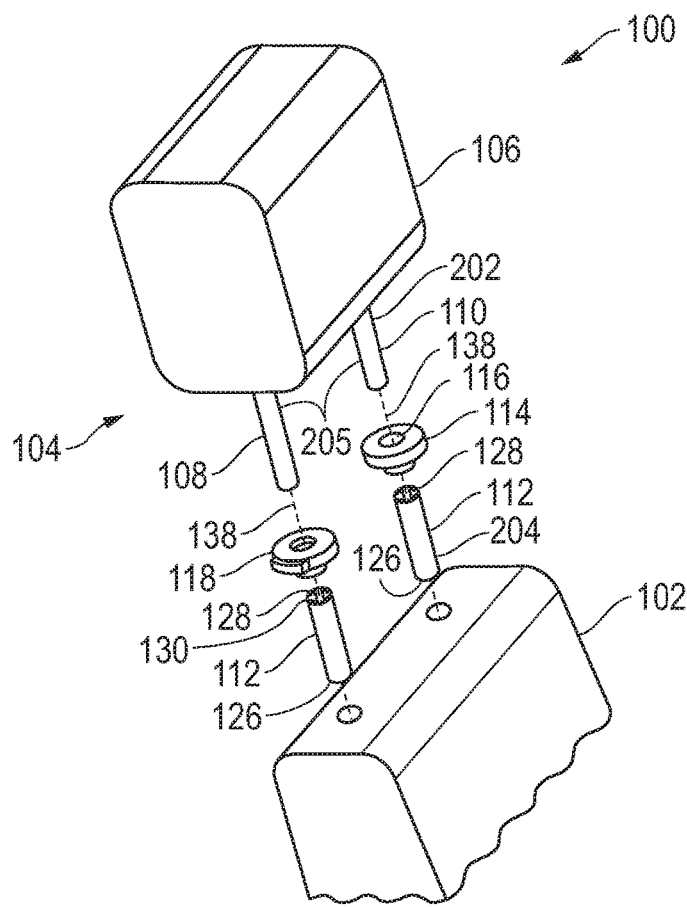
FIG. 7 includes an exploded top perspective view of a vehicle seat assembly in accordance with an embodiment.

In a number of embodiments, as shown in FIG. 7, the second movable component 204 (in this embodiment the clip assembly 112) can have a body 123 defining first and second opposite axial ends 126 and 128, and a lumen 130 extending therebetween. The first movable component 202 (in this embodiment the first and second post 108, 110 of a head cushion 106 assembly) may slide or move relative to the second movable component 204 through the lumen 130 of the second movable component 204. In a particular embodiment, the body 123 may be generally cylindrical. In another embodiment, the body 123 may be cuboidal or otherwise non-cylindrical. In yet a further embodiment, the body 123 may have an ovular cross-sectional profile. In a further embodiment, the body 123 may have a non-uniform profile. For example, the body 123 can have a first cross-sectional profile at a first location and a second cross-sectional profile at a second location, the first and second cross-sectional profiles being different from one another. In an embodiment, the first component 120 or body 123 may be in the form of a support or mounting 124 suitable for attaching to the second component 122. In another embodiment, the first component 120 may be a support that the mounting 124 attaches to that may also be attached to the second component 122. In an embodiment, the second component 122 can extend radially inward from the first component 120 into the lumen 130. In another embodiment, the second component 122 can extend radially outward from the first component 120.

The clip assembly 112 can include a plurality of second components 122. For example, the clip assembly 112 can include at least three second components 122, such as at least four second components 122, at least five second components 122, at least ten second components, or even at least twenty-five second components 122. In an embodiment, the second components 122 may be equally spaced apart around a circumference of the clip assembly 112. In an embodiment, the second components 122 may be un-equally spaced apart around a circumference of the clip assembly 112.

In a particular embodiment, at least two of the second components 122 may have the same size, shape, construction, or material selection as compared to one another. In a further embodiment, all of the second components 122 may have the same size, shape, construction, or material selection as compared to one another. This may permit a uniform force profile around the circumference of the clip assembly 112. That is, all of the second components 122 may provide substantially equal radial forces as compared to one another. Skilled artisans will recognize that such uniformity between the second components 122 may not be required. For particular applications it may be desirable for at least two of the second components 122 to differ in size, shape, construction, or material selection as compared to one another. For example, for inner components having non-circular cross-sectional profiles, it may be necessary to use second components of varying geometry, size, construction, or material selection.

In a number of embodiments, as shown in FIGS. 2A-4L, at least one of the second components 122 may include at least one clip 302. The clip may be coupled to, engaged with, or positioned along the first component 120. In a number of embodiments, the clip 302 can provide a sliding force towards the movable substrate 205 located on the first component 120, the first movable component 202, or the second movable component 204. In a number of embodiments, the least one of the clip 302 may have a unitary construction, i.e., the clip 302 may be monolithic. In an embodiment, all of the clips 302 may have unitary constructions.

In a number of embodiments, the clip 302 may include a flange 306. The flange 306 may have a first end 306*a* and a second end 306*b*. The flange 306 may be located in the radial direction relative to a central axis 138 and be a radial flange 306, and include a first axial end 306*a* and a second axial end 306*b*. In a number of variations, the flange 306 may attach or couple the clip or second component 122 to the mounting 124 or first component 120, as shown in FIGS. 4A-4L. In a number of embodiments, the flange 306 may include at least one projection or aperture 315. In a number of variations, the projection or aperture 315 may lock or otherwise place the clip or second component 122 in a static position relative to the mounting 124 or first component 120, as shown in FIGS. 4A-4L. In a number of embodiments, as shown in FIGS. 2A-2D, the at least one projection or aperture 315 may be a flap or tab that couples the clip 302 to the mounting 124 or first component 120. In a number of embodiments, as shown in FIGS. 3A-3D, the at least projection or aperture 315 may be a shaped projection or aperture in the face of the flange 306 that couples the clip 302 to the mounting 124 or first component 120. The projection or aperture 315 may provide a snap in mechanism to attach to the mounting 124, first component 120 or support.

FIGS. 2A-4L show the clip assembly 112, clip 302, and orientation of the clip 302 relative to the first component 120 or mounting 124 according to a number of different embodiments. In a number of embodiments, as shown best in FIGS. 2A and 3A, the clip 302 may include a strip 304. The strip 304 may have a first end 304*a* and a second end 304*b*. The strip 304 may be located in the axial direction relative to a central axis 138 and be an axial strip 304, and include a first axial end 304*a* and a second axial end 304*b*. In another embodiment, the strip 304 may be disposed in a direction perpendicular relative to a central axis 138. In an embodiment, the strip 304 may be oriented relative to the central axis 138 at an angle α where α is within a range of between 0° and 360° along the axis 138 within the first component 120. In an embodiment, the orientation of at least one of the clips 302 or second components 122 may be uniform along an entire axial length of the at least one of the clips 302 or second components 122. In a more particular embodiment, the orientation of all of the clips 302 or second components 122 may be uniform along the entire axial lengths thereof. In another embodiment, the orientation of at least one of the clips 302 or second components 122 may be different (i.e. having a clip 302 with the strip 304 oriented radially or axially different than another clip 302). In a number of embodiments, the first end 304*a* of the strip 304 and the second end 306*b* of the flange 306 may meet to form an intersection 307. In a number of embodiments, as shown best in FIGS. 2A-4L, the strip 304 may have at least one arcuate shape or arcuate shape portion 309. In a number of embodiments, as shown best in FIGS. 2A-4L, the strip 304 may have at least one flat shape portion 311. By way of a non-limiting embodiment, as shown in FIGS. 2A-3A the angle θ between the arcuate shape portion 309 and the flat shape portion 311 can be at least 2°, such as at least 3°, at least 4°, at least 5°, or even at least 10°. In another embodiment, the angle θ can be no greater than 45°, such as no greater than 40°, no greater than 35°, no greater than 30°, no greater than 25°, or even no greater than 20°. In a number of embodiments, as shown best in FIGS. 2A-4L, the strip 304 may have a first flat shape portion 311*a* between the arcuate shape portion 309 and the intersection 307, and a second flat shape portion 311*b* between the arcuate shape portion 309 and first axial end 304*a*. As shown in FIG. 4A, in a number of embodiments, the strip 304 may contact the mounting 124 or first component 120 at the first end 304*a* and second end 304*b* of the strip 304. As shown in FIG. 4B, in a number of embodiments, the strip 304 may flare away from the mounting 124 or first component 120 after laying substantially parallel to it along a first flat shape portion 311*a*. As shown in FIG. 4C, in a number of embodiments, the strip 304 may lay substantially parallel to the mounting 124 or first component 120 at the first end 304*a* and lay substantially parallel to the mounting 124 at the second end 304*b*. As shown in FIG. 4D, in a number of embodiments, the strip 304 may flare away from the mounting 124 or first component 120 without a first flat shape portion 311*a*. As shown in FIG. 4E in a number of embodiments, the strip 304 may lay substantially parallel to the mounting 124 or first component 120 at the first end 304*a* and lay substantially parallel to the mounting 124 at the second end 304*b*, and the arcuate shape portion 309 may have a filler 317 underneath it to contact or run substantially parallel to the mounting 124 or first component 120. The filler 317 may include a rubber material. The rubber material may be attached to an inbound outer side of the metal strip 1119 or low friction layer 1104 to fill an arc-shaped space formed by the strip 1119. The elastic material may include a nitrile rubber, neoprene rubber, silicone rubber, an olefinic elastomer, a styrene elastomer, a thermoplastic elastomer, a crosslinked elastomer, a polyether-polyester elastomer, an ethylene-propylene elastomer, ethylene-acrylate rubbers and/or a fluoro elastomer, combination thereof, or may be another type. As shown in FIG. 4F, in a number of embodiments, the strip 304 may lay substantially parallel to the mounting 124 or first component 120 at the first end 304a and lay substantially parallel to the mounting 124 at the second end 304b, with a first flange 306' and a second flange 306" both coupling the clip 302 to the first component 120. As shown in FIG. 4G, in a number of embodiments, the strip 304 may include an arcuate shape portion 309 that contacts and/or overlaps the mounting 124 or first component 120 at a plurality of points. As shown in FIGS. 4H-4I, in a number of embodiments, the strip 304 may include a plurality of arcuate shape portions 309a, 309b, 309c, 309d that form an node 319 wherein the arcuate shape portions 309a, 309b, 309c, 309d contact and/or overlap the mounting 124 or first component 120 at a plurality of points. As shown in FIG. 4J, in a number of embodiments, the clip 302 may include a plurality of arcuate shape portions 309a, 309b, and 309c emanating from a single first flat shape portion 311a that may be formed of a 3-D cross-section of a U shape and fitted around the mounting 124 or first component 120, wherein the arcuate shape portions 309a, 309b, and 309c contact and/or overlap the mounting 124 or first component 120 at a plurality of points. Further, per exemplary FIG. 4J, the first component 120 may have a polygonal cross-section when viewed perpendicular to the central axis 138. Exemplary polygonal cross-sections include: a triangle, a quadrilateral, a pentagon, a hexagon, a heptagon, an octagon, a nonagon, or even a decagon. Additional shapes are contemplated herein and generally include polygons or ellipsoids, alone or in combination. The clip 302 may further include at least one flange 306 as shown. As shown in FIGS. 4K-4L, in a number of embodiments, the clip 302 may include a plurality of arcuate shape portions 309a, 309b emanating from a single first flat shape portion 311a that may be formed of a 3-D cross-section of a L shape and fitted around the mounting 124 or first component 120, wherein the arcuate shape portions 309a, 309b, contact and/or overlap the mounting 124 or first component 120 at a plurality of points, wherein the arcuate shape portions 309a, 309b may be rounded inward or outward. The clip 302 may further include at least one flange 306 as shown.

In a number of embodiments, the clip 302 may have a tapered axial end 321 as shown in FIGS. 4C, 4E. The tapered axial end may assist to facilitate alignment of an inner or outer component, such as a shaft or post, with the clip assembly 112. In a further embodiment, all of the second components 122 may include tapered axial ends. In a particular embodiment, the tapered axial ends may be disposed at the axial end of the clip assembly where the inner or outer component first makes contact with the second component. In yet another embodiment, at least one of the second components may include tapered axial ends at both axial ends thereof.

In an embodiment, the clip 302 can have a thickness $T_C$ in a range of 0.1 mm and 25 mm. In an embodiment, the thickness of the clip 302 may be uniform, i.e., a thickness at a first location of the clip 302 can be equal to a thickness at a second location therealong. In a more particular embodiment, the sidewall 103 can have a thickness $T_C$ in a range of 0.2 mm and 1 mm, such as in a range of 0.25 mm and 1 mm, in a range of 0.3 mm and 1 mm, in a range of 0.35 mm and 1 mm, in a range of 0.4 mm and 1 mm, in a range of 0.45 mm and 1 mm, in a range of 0.5 mm and 1 mm, in a range of 0.55 mm and 1 mm, in a range of 0.6 mm and 1 mm, in a range of 0.65 mm and 1 mm, in a range of 0.7 mm and 1 mm, in a range of 0.75 mm and 1 mm, in a range of 0.8 mm and 1 mm, in a range of 0.85 mm and 1 mm, in a range of 0.9 mm and 1 mm, or even in a range of 0.95 mm and 1 mm. In another embodiment, the thickness $T_C$ can be in a range of 0.2 mm and 0.95 mm, such as in a range of 0.2 mm and 0.9 mm, in a range of 0.2 mm and 0.85 mm, in a range of 0.2 mm and 0.8 mm, in a range of 0.2 mm and 0.75 mm, in a range of 0.2 mm and 0.7 mm, in a range of 0.2 mm and 0.65 mm, in a range of 0.2 mm and 0.6 mm, in a range of 0.2 mm and 0.6 mm, in a range of 0.2 mm and 0.55 mm, in a range of 0.2 mm and 0.5 mm, in a range of 0.2 mm and 0.45 mm, in a range of 0.2 mm and 0.4 mm, in a range of 0.2 mm and 0.35 mm, in a range of 0.2 mm and 0.3 mm, or even in a range of 0.2 mm and 0.25 mm. In a number of embodiments, the thickness $T_C$ of the clip can vary along its length $L_C$. In a more particular embodiment, the clip 302 can have a thickness $T_C$ between 0.35 mm and 0.65 mm.

Figures 2A, 2C:
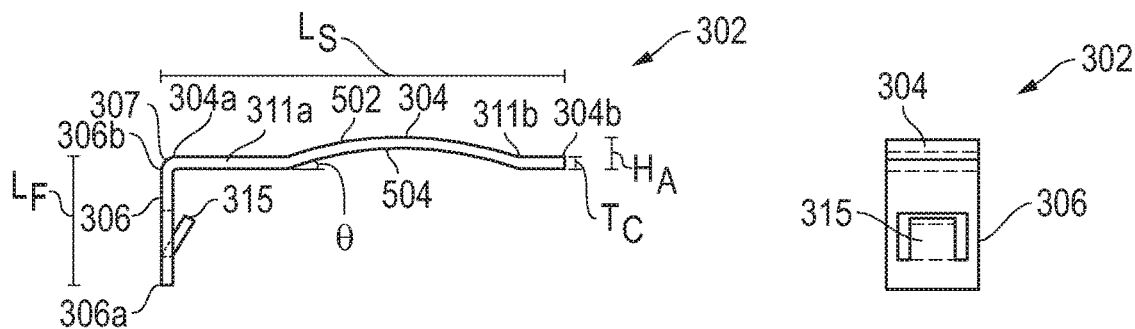
FIG. 2A includes a side view of a clip in accordance with an embodiment.
FIG. 2C includes an end view of a clip in accordance with an embodiment.
Figures 2B, 2D:
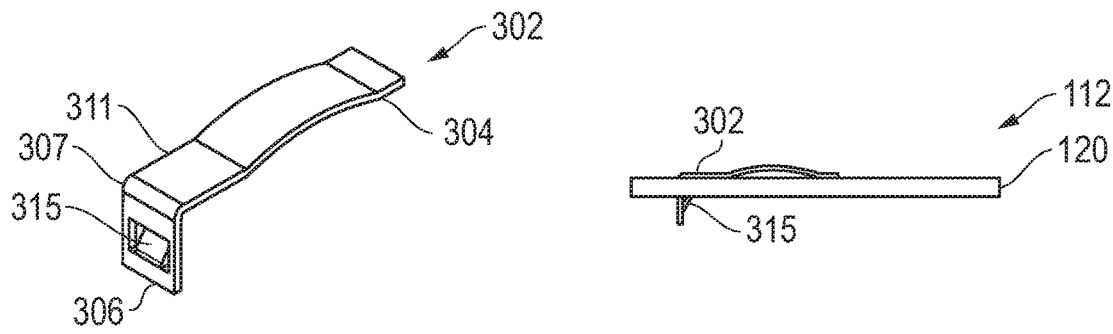
FIG. 2B includes a perspective top view of a clip in accordance with an embodiment.
FIG. 2D includes an end view of a clip and a mounting in accordance with an embodiment.

In a number of embodiments, as shown best in FIGS. 2A, 2B, the clip 302 flange 306 may have a length $L_F$ of at least 1 mm, at least 5 mm, at least 10 mm, at least 15 mm, at least 20 mm, at least 30 mm, at least 40 mm. The flange 306 may have a length $L_F$ that may be no greater than 0.5 mm, no greater than 10 mm, no greater than 15 mm, no greater than 20 mm, no greater than 30 mm, no greater than 40 mm, no greater than 50 mm.

In a number of embodiments, as shown best in FIGS. 2A, 2B, the clip 302 strip 304 may have a length $L_S$ of at least 0.5 mm, at least 10 mm, at least 15 mm, at least 20 mm, at least 30 mm, at least 40 mm. The strip 304 may have a length $L_S$ that may be no greater than 5 mm, no greater than 10 mm, no greater than 15 mm, no greater than 20 mm, no greater than 30 mm, no greater than 40 mm.

In a number of embodiments, the clip 302 may have an arcuate cross-section as viewed along its. Alternatively, the clip 302 may have a polygonal cross-section as viewed along the length. Exemplary polygonal profiles include: a triangle, a quadrilateral, a pentagon, a hexagon, a heptagon, an octagon, a nonagon, or even a decagon. Additional shapes are contemplated herein and generally include polygons or ellipsoids, alone or in combination.

In a number of embodiments, as shown in FIGS. 2A, 2B, the arcuate portion 309 may have a radial height $H_A$ of at least 0.2 mm, at least 0.5 mm, at least 0.10 mm, at least 0.15 mm, at least 0.20 mm, at least 0.30 mm, at least 0.40 mm. The arcuate portion 309 may have a radial height $H_A$ that may be no greater than 0.5 mm, no greater than 0.10 mm, no greater than 0.15 mm, no greater than 0.20 mm, no greater than 0.30 mm, no greater than 0.40 mm.

In an embodiment, as shown in FIG. 5, the clip 302 (including any of the strip 304, the flange 306, or the intersection 307) can include a composite material. The clip 302 may include a substrate or metal strip 1119 and a low friction or sliding layer 1104. The sliding layer 1104 can be coupled to at least a portion of the metal strip 1119. In a particular embodiment, the sliding layer 1104 can be coupled to a surface of the metal strip 1119 so as to form a low friction interface with another surface of another component. In a particular embodiment, the sliding layer 1104 can be coupled to the radially inner surface of the metal strip 1119 so as to form a low friction interface with another surface of another component. In a particular embodiment, the sliding layer 1104 can be coupled to the radially outer surface of the metal strip 1119 so as to form a low friction interface with another surface of another component.

In an embodiment, the metal strip 1119 can at least partially include a metal. The metal may include aluminum, zinc, copper, magnesium, tin, platinum, titanium, tungsten, lead, iron, bronze, alloys thereof, or may be another type. More particularly, the substrate can at least partially include a steel, such as a stainless steel or spring steel. For example, the substrate can at least partially include a 301 stainless steel. The 301 stainless steel may be annealed, ¼ hard, ½ hard, ¾ hard, or full hard. The metal strip 1119 may include a woven mesh or an expanded metal grid. Alternatively, the woven mesh can be a woven polymer mesh. In an alternate embodiment, the metal strip 1119 may not include a mesh or grid. In another alternate embodiment, the metal strip 1119, as a solid component, woven mesh or expanded metal grid, may be embedded between at least one adhesive layer 1121 included between the sliding layer 1104 and the metal strip 1119. In at least one embodiment, the metal strip 1119 may be any kind of metal alloy which provides an elastic behavior under application load in an arcuate shape.

Optionally, the clip 302 may include at least one adhesive layer 1121 that may couple the sliding layer 1103 to the metal strip 1119. The adhesive layer 1121 may include any known adhesive material common to the ring arts including, but not limited to, fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C═O, —C—O—R, —COH, —COOH, —COOR, —CF$_2$═CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 1121 can have a thickness of about 1 to 50 microns, such as about 7 to 15 microns.

Optionally, the metal strip 1119 may be coated with corrosion protection layers 1704 and 1705 to prevent corrosion of the clip 302 prior to processing. Additionally, a corrosion protection layer 1708 can be applied over layer 1704. Each of layers 1704, 1705, and 1708 can have a thickness of about 1 to 50 microns, such as about 7 to 15 microns. Layers 1704 and 1705 can include a phosphate of zinc, iron, manganese, or any combination thereof, or a nano-ceramic layer. Further, layers 1704 and 1705 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 1708 can include functional silanes, nano-scaled silane based primers, hydrolyzed silanes, organosilane adhesion promoters, solvent/water based silane primers. Corrosion protection layers 1704, 1706, and 1708 can be removed or retained during processing.

Optionally, the clip 302 may further include a corrosion resistant coating 1125. The corrosion resistant coating 1125 can have a thickness of about 1 to 50 microns, such as about 5 to 20 microns, and such as about 7 to 15 microns. The corrosion resistant coating can include an adhesion promoter layer 127 and an epoxy layer 129. The adhesion promoter layer 1127 can include a phosphate of zinc, iron, manganese, tin, or any combination thereof, or a nano-ceramic layer. The adhesion promoter layer 1127 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy layer 1129 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin layer 1129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C═O—O—C═O—R' where R can be $C_xH_yX_zA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

In an embodiment, the sliding layer 1104 can comprise materials including, for example, a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. In an example, the sliding layer 1104 includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the low friction/wear resistant layer includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the low friction/wear resistant layer includes polyketone, such as polyether ether ketone (PEEK), polyether ketone, polyether ketone ketone, polyether ketone ether ketone, a derivative thereof, or a combination thereof. In an additional example, the low friction/wear resistant layer may be an ultra high molecular weight polyethylene. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. The sliding layer 1104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, lead, iron, bronze, steel, spring steel, stainless steel), a metal alloy (including the metals listed), an anodized metal (including the metals listed) or any combination thereof. Fluoropolymers may be used according to particular embodiments.

The sliding layer 1104 may further include fillers, including glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof.

In an embodiment, the low friction or sliding layer 1104 can have a thickness $T_{FL}$ in a range of 0.01 mm and 0.4 mm, such as in a range of 0.15 mm and 0.35 mm, or even in a range of 0.2 mm and 0.3 mm. In an embodiment, the thickness of the low friction or sliding layer 1104 may be uniform, i.e., a thickness at a first location of the low friction or sliding layer 1104 can be equal to a thickness at a second location therealong. In an embodiment, the strip 304 may include a metal strip 1119, which may be formed with the low friction or sliding layer 1104 at an outer (outbound) side 502 as shown in FIGS. 2A, 3A. In an embodiment, the strip 304 may include a metal strip 1119, may be formed with the low friction or sliding layer 1104 at an inner (inbound) side 504 as shown in FIGS. 2A, 3A. In a number of embodiments, the metal strip 1119 may extend at least partially along a length of the clip 302. The metal strip 1119 may be at least partially encapsulated by the low friction or sliding layer 1104. That is, the low friction or sliding layer 1104 may cover at least a portion of the metal strip 1119. Axial ends of the metal strip 1119 may or may not be exposed from the low friction or sliding layer 1104. In a particular embodiment, the metal strip 1119 may be fully encapsulated in the low friction or sliding layer 1104 such that the metal strip 1119 may not be visibly perceptible. In another embodiment, the metal strip 1119 may include an aperture extending at least partially into the low friction or sliding layer 1104. The aperture can generally reduce stiffness of the clips 302, thereby allowing a specific engineered stiffness profile.

In an embodiment, any of the layers on the clip 302, as described above, can each be disposed in a roll and peeled therefrom to join together under pressure, at elevated temperatures (hot or cold pressed or rolled), by an adhesive, or by any combination thereof. In a number of embodiments, any of the layers of the clip 302, as described above, may be laminated together such that they at least partially overlap one another. In a number of embodiments, any of the layers on the clip 302, as described above, may be applied together using coating technique, such as, for example, physical or vapor deposition, spraying, plating, powder coating, or through other chemical or electrochemical techniques. In a particular embodiment, the low friction or sliding layer 1104 may be applied by a roll-to-roll coating process, including for example, extrusion coating. The low friction or sliding layer 1104 may be heated to a molten or semi-molten state and extruded through a slot die onto a major surface of the metal strip 1119. In another embodiment, the low friction or sliding layer 1104 may be cast or molded.

In other embodiments, any of the layers on the clip 302, as described above, may be applied by a coating technique, such as, for example, physical or vapor deposition, spraying, plating, powder coating, or through other chemical or electrochemical techniques. In a particular embodiment, the low friction layer 134 may be applied by a roll-to-roll coating process, including for example, extrusion coating. The low friction layer 134 may be heated to a molten or semi-molten state and extruded through a slot die onto a major surface of the substrate 132. In another embodiment, the low friction layer 134 may be cast or molded.

In particular embodiments, as shown in FIG. 1, the second components 122 can be installed in the first component 120 by translating one or both of the first or second components 120 or 122 relative to the other of the first or second components 120 or 122 along a central axis 138 of the clip assembly 112. As shown in FIG. 7, in a number of embodiments, the outer (outbound) side 502 of the second component 122 or clip 302 may face inward along the annular first component 120. As shown in FIG. 7, in a number of embodiments, the inner (inbound) side 504 of the second component 122 or clip 302 may face inward along the annular first component 120.

Figures 6A, 6B, 6C, 6D, 6E:
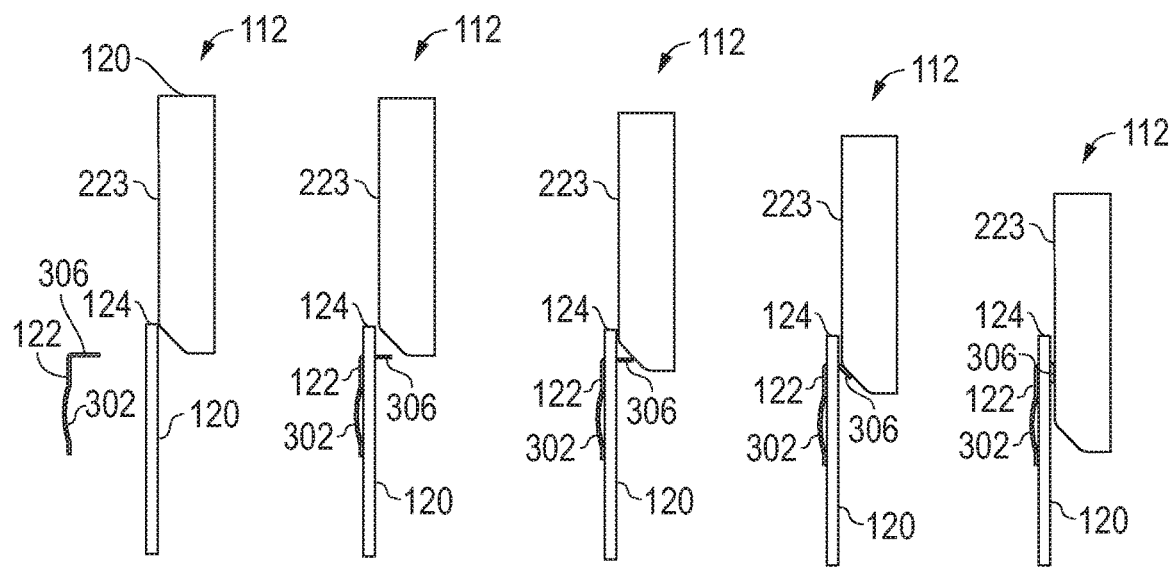
FIG. 6A includes a side view of a clip, a mounting, and a mandrel showing different sections during the forming operation in accordance with an embodiment.
FIG. 6B includes a side view of a clip, a mounting, and a mandrel showing different sections during the forming operation in accordance with an embodiment.
FIG. 6C includes a side view of a clip, a mounting, and a mandrel showing different sections during the forming operation in accordance with an embodiment.
FIG. 6D includes a side view of a clip, a mounting, and a mandrel showing different sections during the forming operation in accordance with an embodiment.
FIG. 6E includes a side view of a clip, a mounting, and a mandrel showing different sections during the forming operation in accordance with an embodiment.

In some embodiments, as shown In FIGS. 6A-6E, the second component 122 or clip 302 can be installed or coupled to the mounting 124 or first component 120, which may be locked together by a mandrel 223. As shown in FIGS. 6A-6B, the second component 122 or clip 302 can be installed or coupled to the mounting 124. Next, as shown in FIGS. 6C-6E, the flange 306 of the second component 122 or clip 30 may be deformed or bent to lock the second component 122 or clip 30 into a lock or static position with respect to the mounting 124 or first component 120 by the mandrel 223. The mandrel 223 may be a conventional device known to those of skill in the art.

Figure 8A:
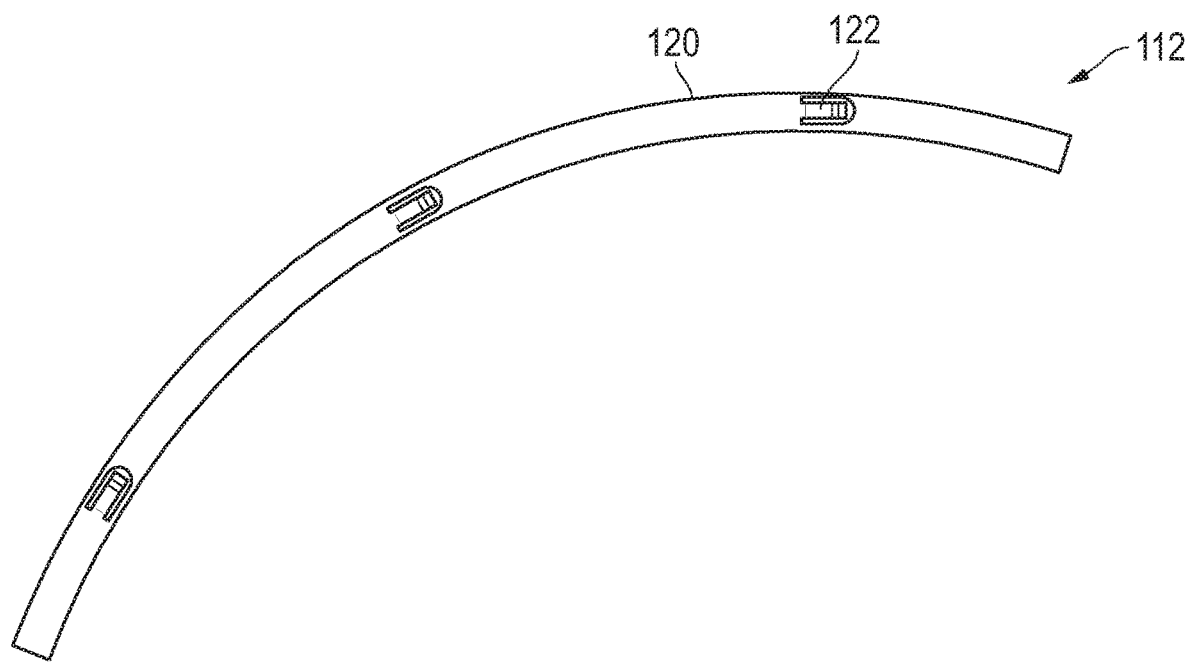
FIG. 8A includes a top view of a clip and a mounting in accordance with an embodiment.
Figure 8B:
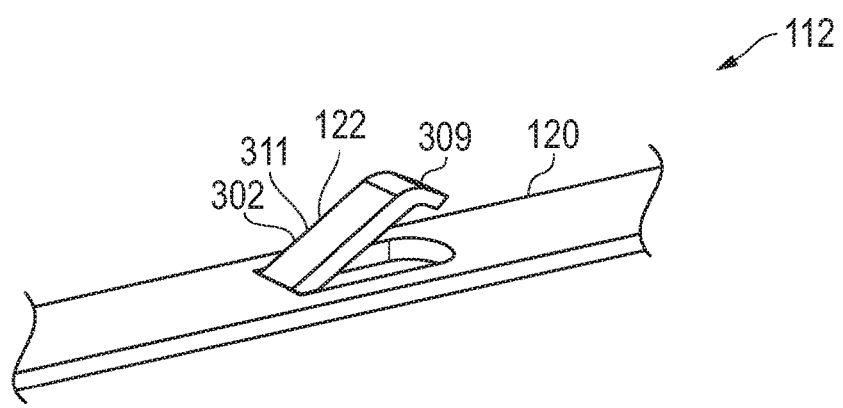
FIG. 8B includes a perspective side view of a clip and a mounting in accordance with an embodiment.
Figure 9A:
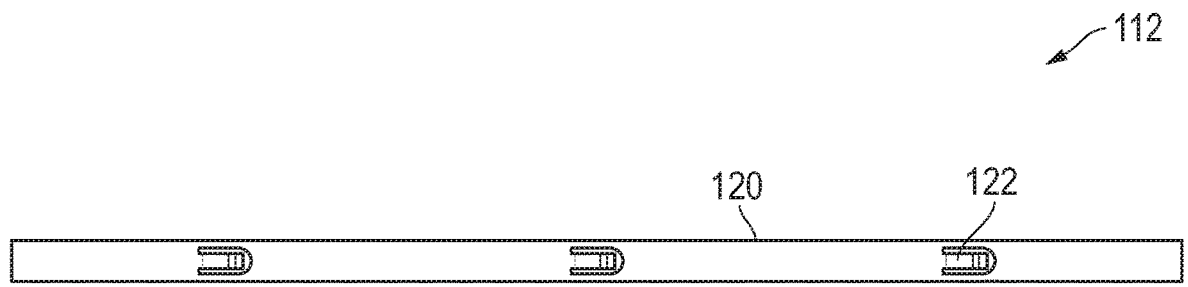
FIG. 9A includes a top view of a clip and a mounting in accordance with an embodiment.
Figure 9B:
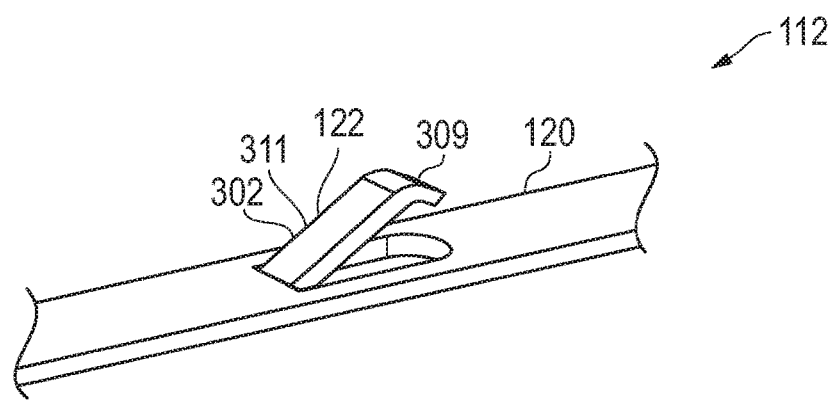
FIG. 9B includes a perspective side view of a clip and a mounting in accordance with an embodiment.

In some embodiments, as shown in FIGS. 8A-8B, the second component 122 or clip 302 can be installed or coupled to the mounting or first component 120, which may be substantially circular, oval, or ellipsis in shape. As shown in FIGS. 8A-8B, the second component 122 or clip 302 can be installed or coupled to the mounting 120 such that the arcuate shape portion 309 resides on the second end 304b of the strip 304 of the clip 302. The clip 302 may further include a flat portion 311 that the arcuate shape portion 309 protrudes from. The second component 122 or clip 302 may be installed in the first component where the first component 120 is a part of a swivel seat or turntable seat assembly. In another embodiment, as shown in FIGS. 9A-9B, the second component 122 or clip 302 can be installed or coupled to the mounting or first component 120, which may be substantially linear in shape.

In other embodiments, the first component 120 can be overmolded to the second component 122. This may be performed by positioning the second components in a jig or other structural support and molding the first component thereover. One or more masking layers can be utilized to prevent accumulation of the first component along a contact surface of the second components. Machining can be performed to further shape the first or second components to a suitable configuration. Exemplary machining techniques include grinding, sanding, ablating, pickling, etching, cutting, drilling, and plating.

In other embodiments, the second components 122 can be overmolded to the first component 120. For example, the first component 120 can be formed to include a central lumen 130. In an embodiment, cutouts can extend into the first component 120 from the lumen 130. In another embodiment, the cutouts can extend into the first component 120 from a radially outer surface of the first component 120. Second components 122 can then be molded into the cutouts and allowed to cure therein. In an embodiment, at least one of the second components 122 can include a body adapted to engage with a cutout 140 (FIG. 1) of the first component 120.

Securing the second component 122 within the cutout 140 can be performed by several techniques. For example, the second component 122 can include a shape that may be generally complementary to the shape of the cutout 140. In another embodiment, the second component 122 can be secured within the cutout 140 by an adhesive, mechanical fastener, or any combination thereof. In another embodiment, as shown in exemplary FIGS. 8A-8B, the first component 120 and the second component 122 may be a single uniform piece, where the second component 122 is formed from the first component 120 via stamping, cutting, or through another method.

In a number of embodiments, the first component 120 may include a resilient material, such as a metal or a rigid polymer. In those embodiments where the first component 120 may be overmolded to the second components 122, it may be desirable to utilize a polymer having suitable molding characteristics. Exemplary polymers include a polyamide (PA), a polybutylene terephthalate (PBT), a polyphenylene sulfide (PPS), ethylene tetrafluoroethylene (ETFE), a polyetherketone (PEEK), a polyester (PE), a polyethyleneimine (PEI), a polyethersulfone (PESU), a polyethylene terephthalate (PET), a polyphthalamide (PPA), a poly (p-phenylene sulfide), a polycarbonate (PC), or a combination thereof. In a particular embodiment, the first component 120 may comprise a nylon, a PBT, a PPA, or a PPS. The nylon may be, for example, nylon 6, nylon 66, nylon 610, nylon 612, nylon 66/6, nylon 410, or nylon 46.

Referring back to FIG. 1, in a number of embodiments, as in the case of a clip assembly 112 having radially inward extending clips 302, a best fit innermost circle of the clip assembly 112 can be formed tangent to the clips 302. In this regard, an inner component or movable substrate 205 may contact the clip assembly 112 only at innermost contact portions of the clips 302. Thus, an effective radial gap 146 can be disposed between the inner component or movable substrate 205 and the first component 120 along at least a portion, such as a majority, of the circumference of the inner component or movable substrate 205. In the case of a clip assembly 112 having radially outward clips 302, a best fit innermost circle of the clip assembly 112 can be formed tangent to the clips 302. In this regard, an inner component or movable substrate 205 may contact the clip assembly 112 only at outermost contact portions of the clips 302. Thus, an effective radial gap can be disposed between the clips 302 and the inner component or movable substrate 205 along at least a portion, such as a majority, of the circumference of the first component 120. In a number of embodiments, the clips 302, second components 122, or strips 304 may be positioned relative to each other surrounding the movable substrate 205 at an angle between two adjacent strips in a range from 30 degrees to 180 degrees.

Whereas traditional plain bearings form full, or nearly full, circumferential contact with an internal component, embodiments of the present clip assembly 112 can have reduced area contact. Moreover, those areas of the clip assembly 112 having effective radial gaps 146 can be formed without costly low friction materials, thereby reducing material and manufacturing costs to make the clip assembly 112.

In a number of embodiments, at least one of the clips 302 or second components 122 extend at least partially between the first and second opposite axial ends 126 and 128 of the first component 120. In a particular embodiment, the clips 302 or second components 122 may extend along at least 20% of the axial length of the first component 120, such as at least 30% of the axial length of the first component 120, at least 40% of the axial length of the first component 120, at least 50% of the axial length of the first component 120, at least 60% of the axial length of the first component 120, at least 70% of the axial length of the first component 120, at least 80% of the axial length of the first component 120, or even at least 90% of the axial length of the first component 120. In a more particular embodiment, at least one of the clips 302 or second components 122 may extend along no greater than 100% of the axial length of the first component 120, such as along no greater than 99% of the axial length of the first component 120, along no greater than 98% of the axial length of the first component 120, along no greater than 97% of the axial length of the first component 120, along no greater than 96% of the axial length of the first component 120, or even along no greater than 95% of the axial length of the first component 120.

In accordance with one or more of the embodiments described herein, a single column of clips 302 or second components 122 can include a plurality of clips 302 or second components 122. In another embodiment, at least one of the axial columns of clips 302 or second components 122 can include at least clips 302 or second components 122. Utilization of multi-component axial columns further reduces material costs and unnecessary contact between the clip assembly 112 and the inner component or movable substrate 205.

In an embodiment, at least one of clips 302 or second components 122 may have a uniform cross-sectional shape along at least 25% of an axial length thereof, such as along at least 30% of the axial length, along at least 35% of the axial length, along at least 40% of the axial length, along at least 45% of the axial length, along at least 50% of the axial length, along at least 55% of the axial length, along at least 60% of the axial length, along at least 65% of the axial length, along at least 70% of the axial length, along at least 75% of the axial length, or even along at least 80% of the axial length. In an embodiment, the shape of at least one of the clips 302 or second components 122 may be uniform along an entire axial length of the at least one of the clips 302 or second components 122. In a more particular embodiment, the shape of all of the clips 302 or second components 122 may be uniform along the entire axial lengths thereof. Non-uniform clips 302 or second components 122 may be particularly advantageous in applications having inner components with non-uniform cross sections. For example, the inner component may have both a polygonal portion and an ellipsoidal portion. Alternatively, the inner component may have different diameters at different locations therealong. Tapered or otherwise varying shapes may enhance engagement with such inner components.

In a number of embodiments, the arcuate shape portion 309 of the clip 302 may be capable of transmitting relatively high radial forces (e.g., 200 N or less or more) to locate stably and provide radial stiffness between the first component 120 and the movable substrate 205. In a number of variations, the arcuate shape portion 309 of the clip 302 may provide a radial stiffness between the component 120 and the movable substrate 205 of no less than about 1,000 N/mm, of such as no less than about 1100 N/mm, such as no less than about 1200 N/mm, no less than about 1300 N/mm, no less than about 1500 N/mm, no less than about 1700 N/mm, no less than about 2000 N/mm, no less than about 2100 N/mm, no less than about 2200 N/mm, no less than about 2300 N/mm, no less than about 2400 N/mm, no less than about 2500 N/mm, no less than about 3000 N/mm, no less than about 3500 N/mm, or even no less than about 4000 N/mm. In yet other embodiments, the arcuate shape portion 309 of the clip 302 may provide a radial stiffness between the component 120 and the movable substrate 205 of no greater than about 7500 N/mm, such as no greater than about 7000 N/mm, no greater than about 6500 N/mm, no greater than about 6000 N/mm, no greater than about 5500 N/mm, or even no greater than about 5000 N/mm. These may provide a spring rate for the clip between 1 N/mm and 250 N/mm.

The clip 302 or clip assembly 112 may be used between a first component 120 and a sliding component 205 when used in linear movement assemblies (e.g. seat-adjustment assemblies, head-restraint assemblies, swivel seat assemblies, turntable seat assemblies, armrest assemblies, seat-track assemblies, sunroof assemblies, display assemblies, trunkcover assemblies, or may be another type). The clip 302 or clip assembly 112 may be used between a first component 120 and a sliding component 205 when used in rotary movement assemblies (e.g. glovebox assemblies, sunvisor assemblies, shelf assemblies, drawer assemblies, or may be another type).

Referring back to FIG. 7, as a non-limiting example, a vehicle seat assembly 100 can generally include a seat back 102 coupled to a seat bottom (not illustrated). A head restraint assembly 104 can engage with the seat back 102 and can include a head cushion 106 and two posts 108 and 110 extending therefrom. The posts 108 and 110 can be insertable into the seat back 102 in a manner so as to allow relative movement between the head cushion 106 and the seat back 102. Specifically, the posts 108 and 110 can be adapted to longitudinally translate relative to the seat back 102, allowing the head cushion 106 to be suitably adjusted for occupants of varying size.

One or more clip assemblies 112 can be disposed at least partially within the seat back 102 and secured therewith. In an embodiment, at least one of the clip assemblies 112 may be coupled with the seat back 102 by at least one of a weld, an adhesive, a mechanical fastener, or any other suitable coupling arrangement. In this regard, the clip assembly 112 may be statically affixed to the seat back 102.

A component 114 may be coupled to an axial end of at least one of the clip assemblies 112. The component 114 may attach to the clip assembly 112 and include a central aperture 116 into which the posts 108 and 110 can be inserted.

In an embodiment, the vehicle seat assembly 100 can include a locking component 118 similar to the component 114. The locking component 118 may include a body having a central aperture extending therethrough. The locking component 118 may further include a locking mechanism adapted to selectively prevent longitudinal translation of the post 108 relative to the seat back 102. The above description of the vehicle seat assembly 100 is exemplary and not intended to limit the embodiments described herein.

A method may be described herein for providing a sliding force towards a movable substrate 205 including providing an assembly 112 comprising a movable substrate 205 and a clip 302, the clip 302 comprising at least one strip 304, wherein the at least one strip 304 comprises a first axial end 304a and a second axial end 304b and an arcuate shape 309 between the first axial end 304a and the second axial end 304b; and the at least one strip 304 may a metal strip 1119 comprising a sliding layer 1104 at an outbound side 502. The method may further include moving the movable substrate 205 such that the clip 302 can provide a desired sliding force towards the movable substrate 205.

In an embodiment, the assembly 2 can be installed or assembled by an assembly force of at least 1 kgf in a longitudinal direction relative to the shaft 4 or housing 8, such as at least 2 kgf, at least 3 kgf, at least 4 kgf, at least 5 kgf, at least 10 kgf, or even at least 15 kgf. In a further embodiment, the torque assembly 2 can be installed or assembled by an assembly force of no greater than 20 kg in a longitudinal direction to the housing 8, such as no greater than 19 kgf, no greater than 18 kgf, no greater than 17 kgf, or even no greater than 16 kgf. In a number of embodiments, the projection 120 of the ring 100 may have a snap-in function that can reduce assembly force by a factor of 5 to 10.

The clip 304, clip assembly 112, or method may replace a bushing or bearing sleeve, allowing for a more cost efficient sliding interface that uses less material. Further, the clip 304, clip assembly 112, or method may be grease free or self-lubricating. Further, the clip 304, clip assembly 112, or method may allow for tolerance compensation of the moving substrate 205 and/or the first component 120, or any surrounding components. Further, the clip 304, clip assembly 112, or method may provide misalignment compensation between the moving substrate 205 and/or the first component 120, or any surrounding components in any direction. Further, the clip 304, or clip assembly 112, or method may be used given any shape of the moving substrate 205 and/or first component 120. Further, the clip 304, or clip assembly 112, or method may provide increased stiffness in the arcuate shape portion 309. Further, the clip 304, or clip assembly 112, or method may reduce vibration or noise and may decouple noise and vibration. Further, the clip 304, or clip assembly 112, or method may reduce sticking of the substrate 205 to the first component 120.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A clip for providing a sliding force towards a movable substrate, the clip comprising at least one strip, wherein the at least one strip comprises a first axial end and a second axial end and an arcuate shape between the first axial end and the second axial end; the at least one strip is a metal strip comprising a sliding layer at an outbound side.

Embodiment 2

An assembly comprising a movable substrate and a clip for providing a sliding force towards the movable substrate, the clip comprising at least one strip, wherein the at least one strip comprises a first axial end and a second axial end and an arcuate shape between the first axial end and the second axial end; the at least one strip is a metal strip comprising a sliding layer at an outbound side; at least one radial flange projecting radially from the first axial end and/or the second axial end of the at least one strip; and at least one projection or aperture suitable for attaching the clip to a support.

Embodiment 3

A method for providing a sliding force towards a movable substrate, comprising: providing an assembly comprising a movable substrate and a clip, the clip comprising at least one strip, wherein the at least one strip comprises a first axial end and a second axial end and an arcuate shape between the first axial end and the second axial end; and the at least one strip is a metal strip comprising a sliding layer at an outbound side; moving the movable substrate such that the clip can provide a desired sliding force towards the movable substrate.

Embodiment 4

The clip, assembly, or method of any of the precedent embodiments, wherein the clip further comprises at least one radial flange projecting radially from the first axial end and/or the second axial end of the at least one strip.

Embodiment 5

The clip, assembly, or method of any of the precedent embodiments, wherein the at least one strip further comprises at least one projection or aperture suitable for attaching the clip to a support.

Embodiment 6

The clip, assembly, or method of embodiment 5, wherein the at least one projection or aperture is positioned at the at least one radial flange.

Embodiment 7

The clip, assembly, or method of embodiments 5 or 6, wherein the at least one projection or aperture comprises a snap in mechanism for attaching to the support.

Embodiment 8

The clip, assembly, or method of any of the precedent embodiments, wherein the sliding layer comprises a polymer.

Embodiment 9

The clip, assembly, or method of embodiment 8, wherein the polymer is selected from the group of a fluoropolymer, polyacetal, polyether ether ketone (PEEK), polyethylene (PE), polysulfone, polyamide (PA), polyphenylene sulfide (PPS), polyurethane (PUR), polyester, polyphenylene oxide, and mixtures thereof.

Embodiment 10

The clip, assembly, or method of any of the precedent embodiments, wherein the metal layer is any kind of metal alloy which provides an elastic behavior under application load in an arcuate shape.

Embodiment 11

The clip, assembly, or method of any of the precedent embodiments, wherein the clip comprises at least two strips.

Embodiment 12

The clip, assembly, or method of embodiment 11, wherein the strips are positioned relative to each other surrounding the movable substrate at an angle between two adjacent strips in a range from 30 degrees to 180 degrees.

Embodiment 13

The clip assembly, or method of any of the precedent embodiments, wherein the at least one strip further comprises a rubber material attached to an inbound outer side of the metal strip to fill an arc-shaped space formed by the strip.

Embodiment 14

The clip, assembly, or method of embodiment 13, wherein the rubber material comprises nitrile rubber, neoprene rubber, silicone rubber, an olefinic elastomer, a styrene elastomer, a thermoplastic elastomer, a crosslinked elastomer, a polyether-polyester elastomer, an ethylene-propylene elastomer, ethylene-acrylate rubbers and/or a fluoro elastomer.

Embodiment 15

The clip assembly, or method of any of the precedent embodiments, wherein the movable substrate is a shaft or a profile.

Embodiment 16

The clip, assembly, or method of any of the precedent embodiments, wherein the strip has a polygonal cross-section disposed around multiple sides of the support.

Embodiment 17

The clip or method of embodiment 16, wherein the strip has an L-shaped or U-shaped cross-section.

Embodiment 18

The clip, assembly, or method of any of the precedent embodiments, wherein the clip has at least two flanges.

Embodiment 19

The clip, assembly, or method of any of the precedent embodiments, wherein the strip has a tapered axial end.

Embodiment 20

The clip, assembly, or method of any of the precedent embodiments, wherein the clip is suitable for use in slider systems e.g. seat mechanisms, automotive interior mechanisms, opening/closing mechanisms.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the embodiments.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A clip for providing a sliding force towards a movable substrate, the clip comprising at least one strip,
   wherein the at least one strip comprises a first axial end and a second axial end and an arcuate shape between the first axial end and the second axial end;
   and wherein the at least one strip is a metal strip comprising a sliding layer at an outbound side, wherein the clip further comprises at least one radial flange projecting radially from the first axial end and/or the second axial end of the at least one strip; and at least one projection and at least one aperture suitable for attaching the clip to a support, wherein the clip is monolithic.

2. The clip of claim 1, wherein the at least one projection or aperture is positioned at the at least one radial flange.

3. The clip of claim 2, wherein the at least one projection or aperture comprises a snap in mechanism for attaching to a support.

4. The clip of claim 1, wherein the sliding layer comprises a polymer.

5. The clip of claim 4, wherein the polymer is selected from the group of a fluoropolymer, polyacetal, polyether ether ketone (PEEK), polyethylene (PE), polysulfone, polyamide (PA), polyphenylene sulfide (PPS), polyurethane (PUR), polyester, polyphenylene oxide, and mixtures thereof.

6. The clip of claim 1, wherein the metal layer is any kind of metal alloy which provides an elastic behavior under application load in an arcuate shape.

7. The clip of claim 1, wherein the at least one strip further comprises a rubber material attached to an inbound outer side of the metal strip to fill an arc-shaped space formed by the strip.

8. The clip of claim 7, wherein the rubber material comprises nitrile rubber, neoprene rubber, silicone rubber, an olefinic elastomer, a styrene elastomer, a thermoplastic elastomer, a crosslinked elastomer, a polyether-polyester elastomer, an ethylene-propylene elastomer, ethylene-acrylate rubbers and/or a fluoro elastomer.

9. The clip of claim 1, wherein the at least one radial flange comprises at least two flanges.

10. The clip of claim 1, wherein the strip has a tapered axial end.

11. An assembly comprising a movable substrate and a clip for providing a sliding force towards the movable substrate, the clip comprising at least one strip,
    wherein the at least one strip comprises a first axial end and a second axial end and an arcuate shape between the first axial end and the second axial end;
    the at least one strip is a metal strip comprising a sliding layer at an outbound side;
    at least one radial flange projecting radially from the first axial end and/or the second axial end of the at least one strip; and
    at least one projection and at least one aperture suitable for attaching the clip to a support, wherein the clip is monolithic.

12. The assembly of claim 11, wherein the movable substrate is a shaft or a profile.

13. The assembly of claim 11, wherein the clip is suitable for use in slider systems e.g. seat mechanisms, automotive interior mechanisms, opening/closing mechanisms.

14. A method for providing a sliding force towards a movable substrate, comprising:
    providing an assembly comprising the movable substrate and a clip, the clip comprising at least one strip, wherein the at least one strip comprises a first axial end and a second axial end and an arcuate shape between the first axial end and the second axial end;
    and wherein the at least one strip is a metal strip comprising a sliding layer at an outbound side;
    moving the movable substrate such that the clip can provide a desired sliding force towards the movable substrate, wherein the clip further comprises at least one radial flange projecting radially from the first axial end and/or the second axial end of the at least one strip; and at least one projection and at least one aperture suitable for attaching the clip to a support, wherein the clip is monolithic.

* * * * *